US008023632B2

(12) United States Patent
Gruchala

(10) Patent No.: US 8,023,632 B2
(45) Date of Patent: *Sep. 20, 2011

(54) METHOD, SYSTEM AND ARTICLE FOR PROVIDING A FAMILY TELECOMMUNICATION SERVICE USING AN ORIGINATING DUAL-TONE MULTI-FREQUENCY TRIGGER

(75) Inventor: Carol Gruchala, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,996

(22) Filed: Dec. 9, 2009

(65) Prior Publication Data
US 2010/0086116 A1    Apr. 8, 2010

Related U.S. Application Data

(63) Continuation of application No. 09/652,540, filed on Aug. 31, 2000, now Pat. No. 7,653,190.

(51) Int. Cl.
*H04M 3/42* (2006.01)

(52) U.S. Cl. ......... 379/201.02; 379/201.07; 379/201.08; 379/211.01; 379/211.02

(58) Field of Classification Search ............. 379/201.02, 379/201.07, 201.08, 211.01, 211.02
See application file for complete search history.

(56) References Cited

U.S. PATENT DOCUMENTS

| | | | |
|---|---|---|---|
| 4,266,098 A | 5/1981 | Novak | |
| 4,277,649 A | 7/1981 | Sheinbein | |
| 4,899,373 A | 2/1990 | Lee et al. | |
| 5,199,062 A | 3/1993 | Von Meister et al. | |
| 5,206,901 A | 4/1993 | Harlow et al. | |
| 5,222,120 A | 6/1993 | McLeod et al. | |
| 5,274,695 A | 12/1993 | Green | |
| 5,276,731 A | 1/1994 | Arbel et al. | |
| 5,327,492 A | 7/1994 | Parola | |
| 5,329,578 A | 7/1994 | Brennan et al. | |
| 5,467,390 A | 11/1995 | Brankley et al. | |
| 5,471,519 A | 11/1995 | Howe et al. | |
| 5,511,111 A | 4/1996 | Serbetcioglu et al. | |
| 5,526,406 A | 6/1996 | Luneau | |
| 5,550,899 A | 8/1996 | McLeod et al. | |
| 5,555,290 A | 9/1996 | McLeod et al. | |
| 5,568,546 A | 10/1996 | Marutiak | |
| 5,590,181 A | 12/1996 | Hogan et al. | |
| 5,592,539 A | 1/1997 | Amarant et al. | |
| 5,651,053 A | 7/1997 | Mitchell | |
| 5,668,862 A | 9/1997 | Bannister et al. | |
| 5,692,038 A | 11/1997 | Kraus et al. | |
| 5,717,738 A | 2/1998 | Gammel | |
| 5,745,553 A | 4/1998 | Mirville et al. | |
| 5,754,630 A | 5/1998 | Srinivasan | |

(Continued)

*Primary Examiner* — Quynh Nguyen
(74) *Attorney, Agent, or Firm* — Cantor Colburn LLP

(57) ABSTRACT

A menu is provided in a telephone call. The menu provides a plurality of destination options including a first destination option for a residence of a family, a second destination option for a first member of the family at a first location other than the residence, and a third destination option for a second member of the family at a second location other than the residence. A first selection of one of the destination options is received in the telephone call, and the telephone call is routed to a first telephone number corresponding to the first selection. Thereafter, an originating dual-tone multi-frequency trigger is detected. The telephone call to the first telephone number is interrupted, a second selection of the destination options is received, and the telephone call is routed to a second telephone number corresponding to the second selection.

17 Claims, 3 Drawing Sheets

U.S. PATENT DOCUMENTS

| | | |
|---|---|---|
| 5,768,356 A | 6/1998 | McKendry et al. |
| 5,796,812 A | 8/1998 | Hanlon et al. |
| 5,802,160 A | 9/1998 | Kugell et al. |
| 5,835,570 A | 11/1998 | Wattenbarger |
| 5,850,435 A | 12/1998 | Devillier |
| 5,867,494 A | 2/1999 | Krishnaswamy et al. |
| 5,867,495 A | 2/1999 | Elliott et al. |
| 5,875,240 A | 2/1999 | Silverman |
| 5,953,401 A | 9/1999 | Caveney |
| 5,978,451 A | 11/1999 | Swan et al. |
| 6,005,930 A | 12/1999 | Baiyor et al. |
| 6,009,159 A | 12/1999 | Baiyor et al. |
| 6,018,575 A | 1/2000 | Gross et al. |
| 6,026,149 A | 2/2000 | Fuller et al. |
| 6,031,903 A | 2/2000 | Partridge, III |
| 6,035,190 A | 3/2000 | Cox et al. |
| 6,041,114 A | 3/2000 | Chestnut |
| 6,047,053 A | 4/2000 | Miner et al. |
| 6,069,946 A | 5/2000 | Lieuwen |
| 6,072,867 A | 6/2000 | Lieuwen |
| 6,144,839 A | 11/2000 | Foladare et al. |
| 6,205,557 B1 | 3/2001 | Chong et al. |
| 6,236,716 B1 | 5/2001 | Marcus et al. |
| 6,259,770 B1 | 7/2001 | Greene |
| 6,327,354 B1 | 12/2001 | Pelletier et al. |
| 6,643,365 B1 | 11/2003 | Dunn et al. |
| 6,879,676 B1 | 4/2005 | Contractor |
| 7,085,363 B2 | 8/2006 | Pelletier et al. |
| 7,580,514 B2 | 8/2009 | Pelletier et al. |

METHOD, SYSTEM AND ARTICLE FOR PROVIDING A FAMILY TELECOMMUNICATION SERVICE USING AN ORIGINATING DUAL-TONE MULTI-FREQUENCY TRIGGER

RELATED APPLICATIONS

The present application is a continuation of U.S. patent application Ser. No. 09/652,540, filed Aug. 31, 2000, now U.S. Pat. No. 7,653,190 the entirety of which is hereby incorporated by reference.

The present application is related to U.S. patent application Ser. No. 11/448,300 (now U.S. Pat. No. 7,580,514), filed Jun. 7, 2006, which is a continuation of U.S. patent application Ser. No. 09/966,574 (now U.S. Pat. No. 7,085,363), filed Sep. 26, 2001, which is a continuation of U.S. patent application Ser. No. 09/375,652 (now U.S. Pat. No. 6,327,354), filed Aug. 17, 1999, the entirety of each of which is hereby incorporated by reference.

TECHNICAL FIELD

The present invention relates to methods, systems, and articles for providing a telecommunication service.

BACKGROUND 800-numbers and other toll-free telephone numbers are used for receiving telephone calls which are to be toll-free to calling parties. Any monthly and per-minute usage fees for incoming calls to a toll-free telephone number are charged to its subscriber.

Personal 800-number services are available to allow toll-free calls to be placed to a subscriber's home. Existing personal 800-number services are directed to one telephone number, which is usually the subscriber's home telephone. Since the subscriber is billed for incoming calls to his/her personal 800-number, the personal 800-number is typically made known to a limited number of persons. For example, the personal 800-number may be made known only to select relatives and friends.

Personal 800-number services are beneficial for individuals, such as business travelers, who wish to avoid hotel surcharges and collect call rates when calling home. Personal 800-number services are also beneficial for receiving calls from friends or relatives who do not have the financial wherewithal to keep in touch by telephone. A family with one or more children may establish a personal 800-number so that a child can make a toll-free call to home. This allows children away at college, for example, to make toll-free calls to home. The personal 800-number is also beneficial in emergency situations where a child, having no means of payment (e.g. coins or a calling card) for a pay telephone, needs to call a parent at home.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Figure 1:
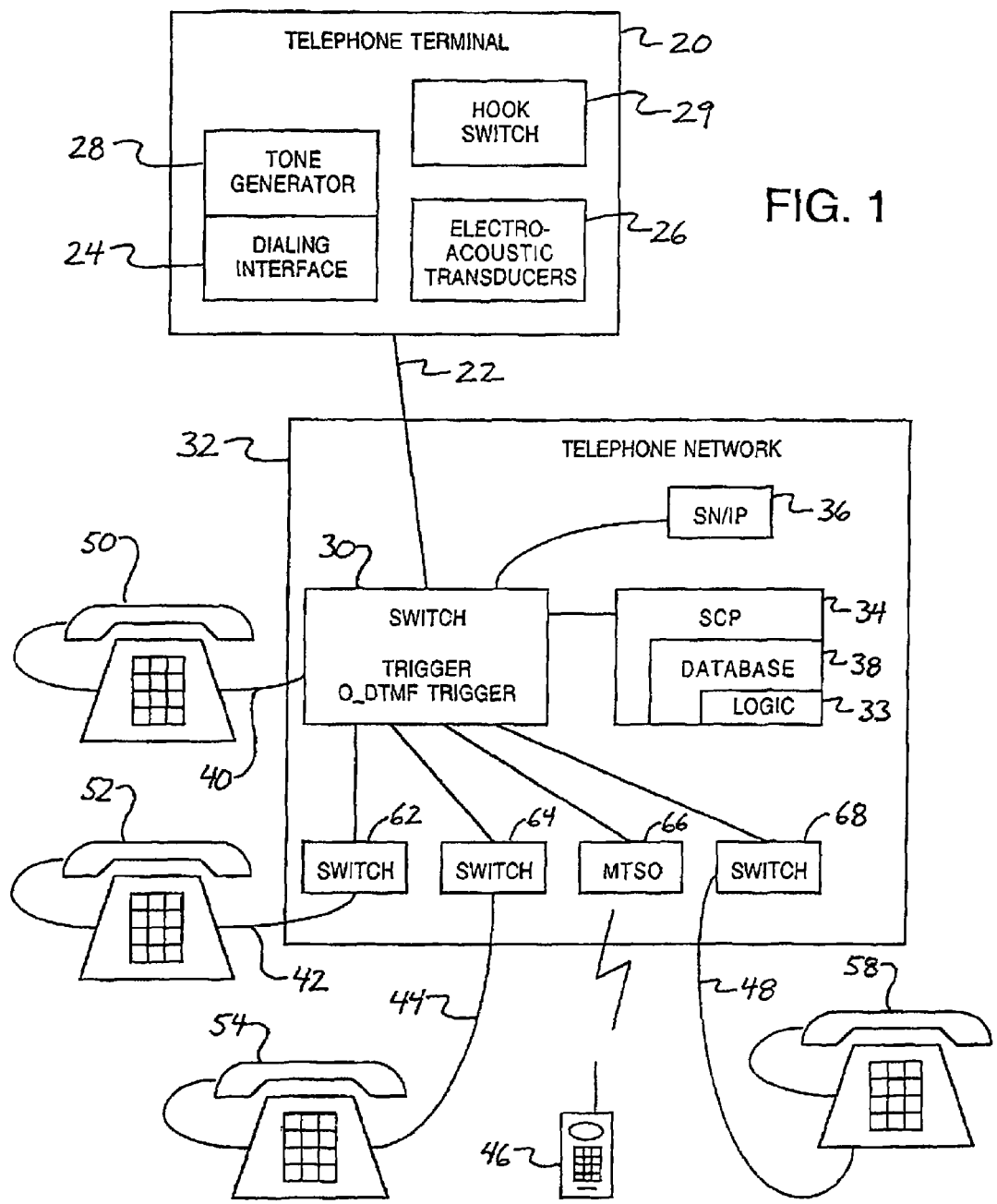
FIG. 1 is a schematic/block diagram of an embodiment of a system for providing a family telecommunication service.

A need exists for a personal toll-free telecommunication service which is not limited to calling home only, but includes other potential locations of one or more parents or other family members. A need also exists for a service in which young users (e.g. having ages from about 8 to about 16) need not remember various telephone numbers for various locations in order to contact one of their parents or family members. A further need exists to provide a service having the aforementioned benefits which allows a user to interrupt a telephone call routed to one of the locations, and to command the call to be routed to another of the locations at any time within the telephone call. A still further need exists to provide a service having the aforementioned benefits which addresses regulatory restrictions on providing inter-LATA (local access and transport area) services.

The present invention provides a residential, family telecommunication service which addresses these and other needs. Briefly, the family telecommunication service facilitates away-from-home access to home and other family member locations by providing a toll-free telephone number linked to a subscriber-defined connection menu. The connection menu provides options for connecting to various family members and/or locations. After a family member calls his/her family toll-free telephone number, the connection menu is provided in an audible message. For example, the message may comprise: "press 1 to call home, press 2 to call Mom at her office, press 3 to call Mom's cellular number, press 4 to call Dad at his office". In response to an input indicating a selected destination, a call is initiated to the selected destination. Embodiments of the herein-described service are amenable for use by a child at school who wishes to call a parent, a child at a pay telephone who wishes to call home, a child away at camp who wishes to call home, and a college student who wishes to call home, for example.

The menu is provided using either a switch-based announcement or an outside announcement located at either a service node, intelligent peripheral or server. In this way, the service may be provided without requiring the service node, intelligent peripheral, an interactive voice response unit or server to be continually connected to the telephone call. Further, by not routing the telephone call to either the service node, intelligent peripheral, interactive voice response unit or server, the issue of providing inter-LATA service is obviated.

An originating dual-tone multi-frequency (O_DTMF) trigger is used to enable the caller to dynamically route the telephone call to another destination at any time within the telephone call. The caller may choose to change the party to whom he/she is connected based on a disposition of the telephone call (e.g. being busy, no answer, or routed to voice mail) without requiring redialing of the toll-free telephone number. Beneficially, the O_DTMF trigger enables the caller to switch destinations beyond any predetermined time interval in the telephone call.

Figure 2:
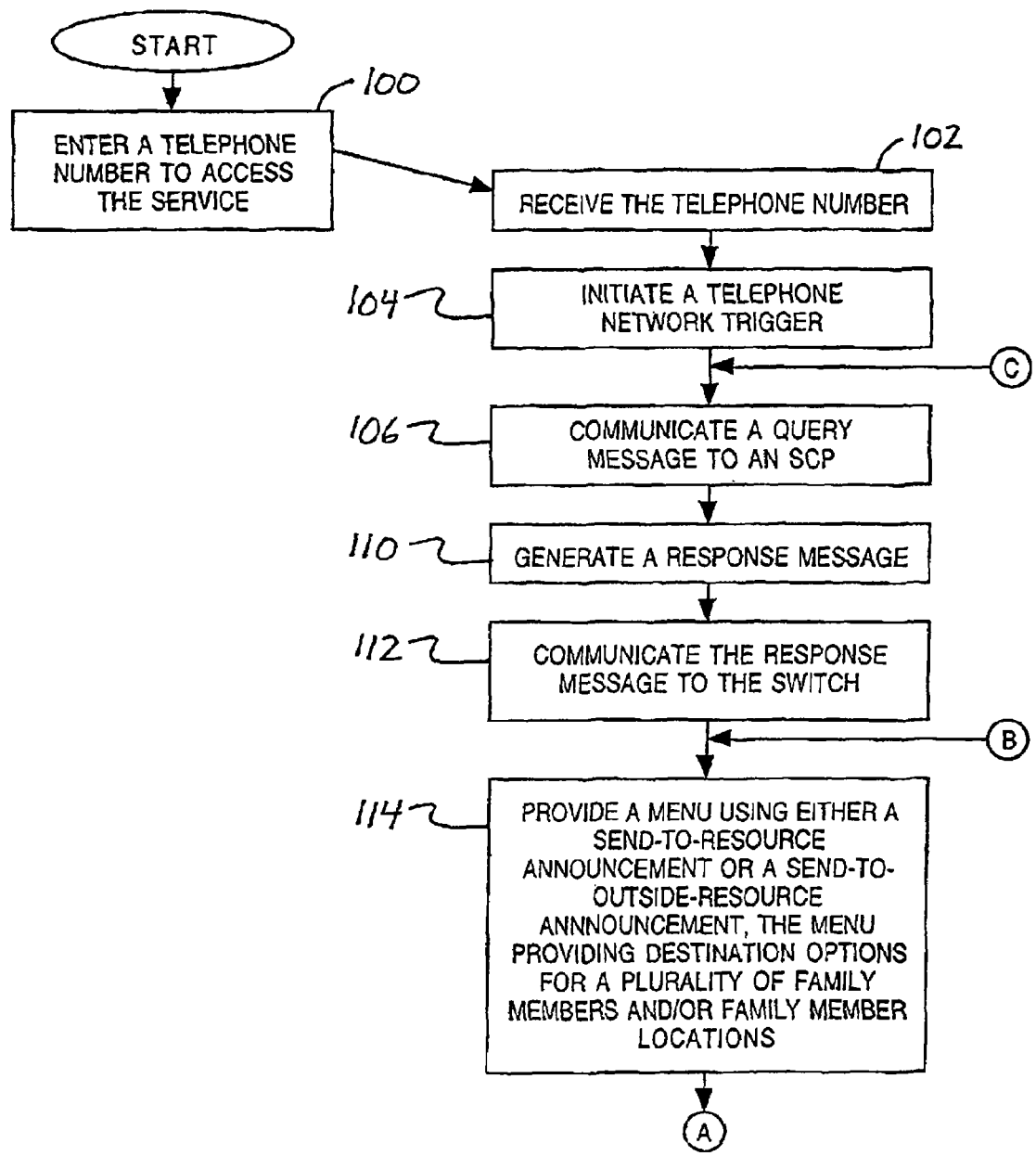
FIGS. 2 and 3 are a flow chart of an embodiment of a method of providing a family telecommunication service.
Figure 3:
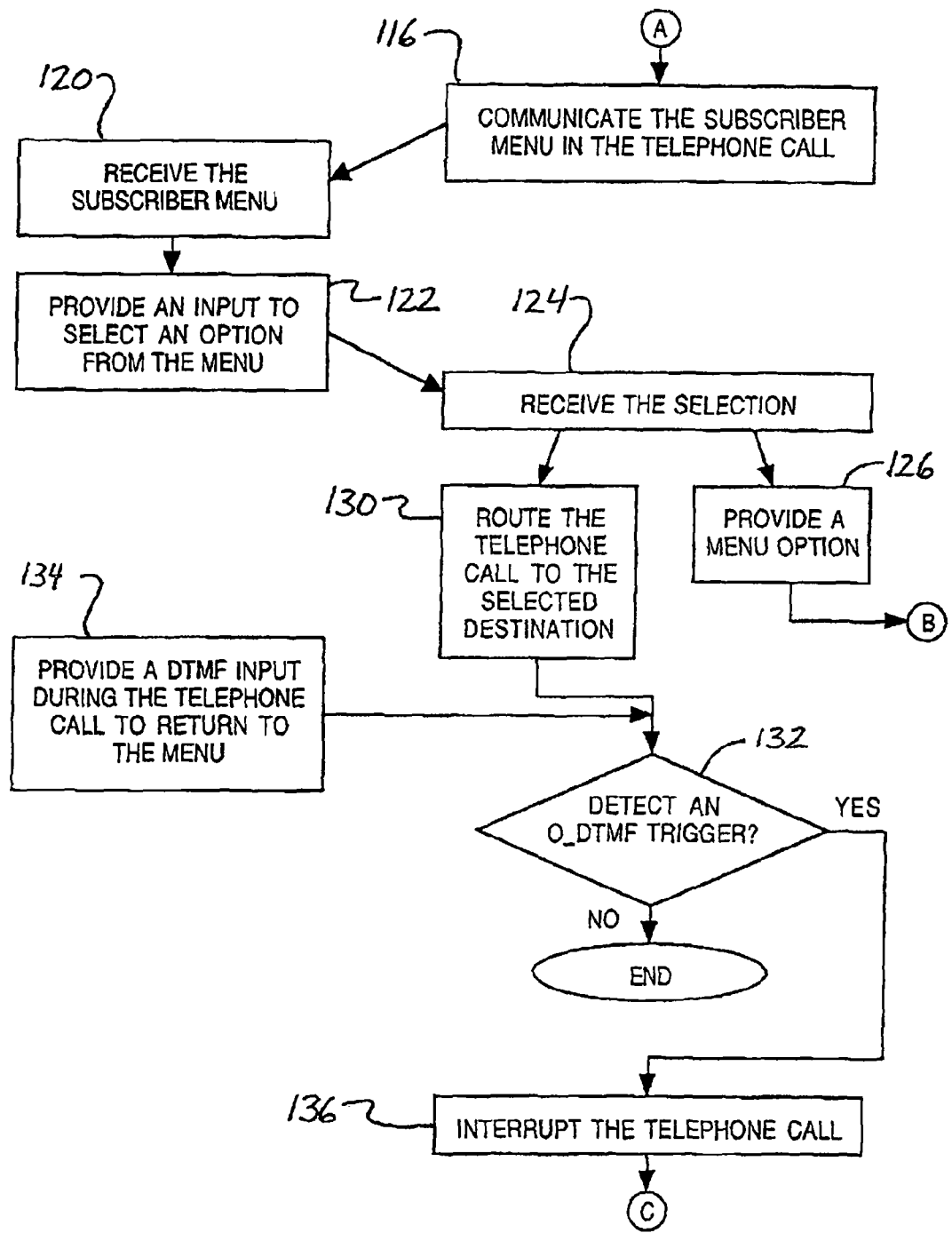

A description of embodiments of the family telecommunication service is made with reference to both FIG. 1, which shows a schematic/block diagram of an embodiment of a system for providing the family telecommunication service, and FIGS. 2 and 3, which show a flow chart of an embodiment of a method of providing the family telecommunication service. Based upon the herein-disclosed high-level description, one or more computer programs to direct telephone network elements to cooperate in providing the service logic are within the skill of a routineer in the art of telecommunications.

As indicated by block 100, a calling party initiates a telephone call by entering or otherwise providing a telephone number for accessing the family telecommunication service. Preferably, the telephone number comprises a toll-free telephone number. Examples of the toll-free number include, but are not limited to, those prefaced by "800", "888", or "877".

For purposes of illustration and example, the telephone number is entered by an end user using a telephone terminal 20 connected to a telephone line 22. Examples of the telephone terminal 20 include, but are not limited to, a telephone set, a facsimile machine, and a computer having a modem.

Regardless of its specific form, the telephone terminal 20 comprises a dialing interface 24 and one or more electroacoustic transducers 26. Preferably, the dialing interface 24 comprises a standard telephone keypad having dialing digit keys of "0" to "9", a "*" key, and a "#" key. A tone generator 28 is responsive to the telephone keypad to generate dual-tone multi-frequency (DTMF) signals. Signals generated by the tone generator 28 are applied to the telephone line 22. The electroacoustic transducers 26 may comprise a speaker to generate audible acoustic pressure waves based upon signals received from the telephone line 22, and a microphone to generate signals for transmission over the telephone line 22 based upon acoustic pressure waves sensed thereby.

Using a landline telephone set, for example, the end user can take the telephone off-hook using a hook switch 29 (e.g. by picking up a handset) and dial the toll-free telephone number using the dialing interface 24.

As indicated by block 102, the telephone number provided by the calling party is received by a telephone network element. Typically, the aforementioned telephone network element includes a switch 30 within a telephone network 32. The switch 30 may comprise a service switching point at a central office which serves the calling party. The telephone network 32 may comprise a public switched telephone network, for example.

As indicated by block 104, a telephone network trigger is initiated based upon the dialed telephone number. The telephone network trigger is detected and initiated by the switch 30 or another telephone network element. Preferably, the telephone network trigger comprises either an IN-trigger for toll-free numbers (e.g. 800, 888 and 877 numbers) or a Specific Digit String trigger to access service logic 33 in a service control point 34.

As indicated by block 106, the switch 30 communicates a query message to the service control point 34 in response to the telephone network trigger. The query message may include the dialed telephone number. The service control point 34 either includes or communicates with a database 38. The database 38 includes instructions for routing calls based upon the dialed telephone number. The database 38 may comprise a toll-free number database, for example.

As indicated by block 110, the service control point 34 generates a response message based upon the query message. The response message includes one or more call-handling instructions based on the service logic 33. As indicated by block 112, the service control point 34 communicates the response message to the switch 30.

The service logic 33 directs an act of providing a menu in the telephone call using either a send-to-resource announcement or a send-to-outside-resource announcement (as indicated by block 114). The announcement may be provided by either the switch 30 or a service node/intelligent peripheral 36.

The menu provides a plurality of destination options for a plurality of family members and/or family member locations. The menu may comprise an audio message containing verbal or spoken information indicating the plurality of destination options and a corresponding digit for each option. The destination options are audibly identified by a name and/or a familial relationship for each of a plurality of family members, and/or a corresponding family member location. Examples of familial relationships include mother, father, daughter, son, sister, brother, aunt, uncle, grandmother and grandfather. Examples of family member locations include a residence location such as a family home, and non-residence locations such as work and automobile. Optionally, a destination option may be at least partially identified by a type of receiver at the destination. For example, a destination option may be identified as being a telephone or a pager. As another option, a destination option may be at least partially identified by a type of telephone at the destination. For example, a destination option may be identified as being mobile, wireless, cellular, satellite or personal communication service (PCS).

The destination options may be limited to only family members. In this case, family members may be defined by blood relationships (e.g. a biological parent of a child) or legal relationships (e.g. a legal guardian of a child). In addition to family members, the destination options may include non-family members such as a babysitter of a child or a neighbor of the child.

For purposes of illustration and example, consider the menu-identified destination options for five different locations having telephone lines denoted by reference numerals 40, 42 and 44, a wireless telephone 46, and a telephone line 48. Each of the telephone lines 40, 42, 44 and 48 has a respective one of telephone terminals 50, 52, 54 and 58 in communication therewith. Each of the telephone lines 40, 42, 44 and 48 is served by a respective one of switches 30, 62, 64 and 68 in the telephone network 32. Although not illustrated as such, two or more of the telephone lines may be served by the same switch in the telephone network 32. The wireless telephone 46 is served by a mobile telephone switching office 66 in the telephone network 32.

Further for purposes of illustration and example, the telephone line 40 is associated with a family residence having a fictitious telephone number of 847/555-0121. The telephone line 42 is associated with a mother's place of work, and has a fictitious telephone number of 312/555-0132. The telephone line 44 is associated with a father's place of work, and has a fictitious telephone number of 708/555-0143. The wireless telephone 46 is the mother's cellular telephone, and has a fictitious telephone number of 847/555-0145. The telephone line 48 is associated with a place that the father is reachable when he is away on business in Detroit. The telephone line 48 has a fictitious telephone number of 313/555-0147.

In the aforementioned example, the subscriber menu may comprise the following audio message: "press 1 to call home, press 2 to call Mom at her office, press 3 to call Mom's cellular number, press 4 to call Dad at his office, press 5 to call Dad in Detroit". In addition, the audio message may provide an option to repeat the destination options. For example, the audio message may further comprise: "press 9 to repeat the menu".

The announcement audibly generates at least a portion of the subscriber menu. The subscriber menu may be generated using speech synthesis and/or speech playback. As indicated by block 116, at least a portion of the audible menu is communicated, in the telephone call, to the calling party. The audible subscriber menu is communicated to the telephone line 22 via the switch 30.

As indicated by block 120, at least a portion of the audible subscriber menu is received by the calling party. The audible subscriber menu is received by the telephone terminal 20 via the telephone line 22. The subscriber menu is made audible to the end user by one of the electroacoustic transducers 26 of the telephone terminal 20.

As indicated by block 122, the end user provides a selection of one of the menu options. The selection may indicate a selected destination option from the menu, or another option such as to repeat the menu. To provide the selection, the end user may provide a dialed input using the dialing interface 24. Preferably, the dialed input consists of a single dialed key selected from the digits 0 to 9, the # key, and the * key.

As indicated by block 124, the input is received from the calling party. Dialed input may be determined by a post-dialing digit collection/detection resource.

If the input indicates a repeat-menu option or another non-call option, the selected option is provided, as indicated by block 126. Thereafter, flow of the method may return to block 114.

If the input indicates a selected destination option from the menu, the telephone call is routed to a telephone number associated with the destination option, as indicated by block 130. Continuing with the above example, if the dialed input comprises the "1" key, the telephone call is routed to the telephone line 40 having a telephone number of 847/555-0120. If the dialed input comprises the "2" key, the telephone call is routed to the telephone line 42 having a telephone number of 312/555-1032. If the dialed input comprises the "3" key, the telephone call is routed to the wireless telephone 46 having a telephone number of 847/555-0145. If the dialed input comprises the "4" key, the telephone call is routed to the telephone line 44 having a telephone number of 708/555-0143. If the dialed input comprises the "5" key, the telephone call is routed to the telephone line 48 having the telephone number of 313/555-0147.

After the telephone call is routed, the switch 30 determines if an originating dual-tone multi-frequency (O_DTMF) trigger is detected in the telephone call (as indicated by block 132). The O_DTMF trigger enables the calling party to interrupt the telephone call by providing a DTMF input during the telephone call (as indicated by block 134). The DTMF input is entered using the dialing interface 24, and may comprise one or more dialed keys selected from the digits 0 to 9, the # key, and the * key. The DTMF input is communicated to the switch 30 via the telephone line 22. The O_DTMF trigger may be set to detect a specific digit or digits, or to detect that any digit has been entered by the calling party.

If the O_DTMF trigger is detected in the telephone call, an act of interrupting the telephone call to the previously-selected destination is performed (as indicated by block 136). The calling party may wish to interrupt the telephone call for a variety of reasons, such as if the called party at the previously-selected destination does not answer the telephone call, if the line is busy at the previously-selected destination, or if voice mail is reached.

After interrupting the telephone call, control of the telephone call is returned to the calling party. Either the entire menu or a portion thereof may be replayed to the calling party in the telephone call. The calling party may provide an input to select another one of the destination options in the telephone call. The telephone call may be routed to a telephone number corresponding to the newly-selected one of the destination options. This process of interrupting the telephone call, replaying at least a portion of the menu, receiving a selection of one of the destination options, and routing the telephone call to a telephone number associated with the selection may be repeated one or more times.

The aforementioned process may be effectuated in a variety of ways. One way to illustrate the flow logic upon interrupting the telephone call is to return back to block 106 to communicate a query message to the service control point 34. It is noted that the query message may either be the same as or differ from the query message initially communicated in response to the telephone network trigger described in block 104. Thus, the query message may request either the same service logic, a portion of the same service logic, or different service logic as the service logic initially requested.

Typically, the herein-described service is provided for a plurality of different subscribers. Each of the subscribers may access the service using the same toll-free telephone number. In this case, a calling party may be required to enter a personal identification number (PIN) or another identification code to identify and access a specific subscriber menu. Alternatively, each of the subscribers may be assigned a corresponding one of a plurality of different toll-free telephone numbers. In this case, one subscriber is uniquely assigned a first toll-free telephone number, and another subscriber is uniquely assigned a second toll-free telephone number to access the service. In either case, the switch 30 and/or the service node/intelligent peripheral 36 stores a plurality of different announcements corresponding to a plurality of different subscriber menus.

Embodiments of the herein-disclosed methods may be directed by computer-readable instructions encoded on a computer-readable medium of the service control point 34. The contents of the computer-readable medium cause one or more telephone network elements to perform the herein-disclosed acts. For this purpose, at least one computer processor associated with the one or more of the herein-disclosed elements is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Thus, there has been described herein several embodiments including preferred embodiments of a method, system and article for providing a family telecommunication service using an originating dual-tone multi-frequency trigger.

It will be apparent to those skilled in the art that the disclosed invention may be modified in numerous ways and may assume many embodiments other than the preferred form specifically set out and described above. For example, either in addition to or as an alternative to audibly presenting the menu, a visible representation of the menu may be provided to the calling party. The visible representation of the menu may be provided using a caller-identification display unit coupled to the telephone line 22. Although described for use with a wireline public switched telephone network, embodiments of the family telecommunication service also may be used in conjunction with a wireless telephone network.

Accordingly, it is intended by the appended claims to cover all modifications of the invention which fall within the true spirit and scope of the invention.

The invention claimed is:

1. A method of providing a telecommunication service, the method comprising:
   providing a menu during a telephone call from a network element of a telecommunications network to a caller, the menu providing a plurality of destination options including a first destination option for a residence of a family, a second destination option for a first member of the family at a first location other than the residence, and a third destination option for a second member of the family at a second location other than the residence;
   receiving during the telephone call a selection of the caller of one of the destination options; and
   routing the telephone call via the telecommunications network to a first telephone number corresponding to the selection;
   detecting a trigger from the caller in the telephone call after routing the telephone call to the first telephone number corresponding to the first selection;
   after the detecting:
   interrupting the telephone call to the first telephone number;
   receiving during the telephone call a second selection of the caller of one of the destination options provided in the menu; and
   routing the telephone call to a second telephone number corresponding to the second selection.

2. The method of claim 1, wherein the plurality of destination options further includes a fourth destination option for the first member of the family at a third location other than the residence, the first location, and the second location.

3. The method of claim 1, wherein the trigger comprises an originating dual-tone multi-frequency trigger.

4. The method of claim 1, further comprising:
   after interrupting the telephone call to the first telephone number, providing a portion of the menu in the telephone call.

5. The method of claim 1, wherein the telecommunications network comprises a public switched telephone network.

6. The method of claim 1, wherein the selection of the caller of one of the destination options is received at the network element within the telecommunications network.

7. The method of claim 5, wherein the selection of the caller of one of the destination options is received at a switch located within a public switched telephone network.

8. A system comprising:
   a first network element located within a telecommunications network, the first network element comprising a first trigger and a second trigger, the first trigger to detect a telephone call placed by a caller to a telephone number and the second trigger enabling the caller to interrupt the telephone call; and
   a second network element comprising service logic accessible by the first network element, the service logic implementing:
   providing to the caller during a telephone call in response to the first trigger a menu providing a plurality of destination options including a first destination option for a residence of a family, a second destination option for a first member of the family at a first location other than the residence, and a third destination option for a second member of the family at a second location other than the residence; and
   receiving during the telephone call a selection of the caller of one of the destination options and routing the telephone call via the telecommunications network to a first telephone number corresponding to the selection;
   the service logic of the second network element implementing:
   in response to the second trigger received from the caller:
   receiving during the telephone call a second selection of the caller of one of the destination options provided in the menu; and
   routing the telephone call to a second telephone number corresponding to the second selection.

9. The system of claim 8, wherein the service logic of the second network element further implements:
   providing a portion of the menu in the telephone call in response to the second trigger received from the caller.

10. The system of claim 8, wherein the second trigger is an originating dual-tone multi-frequency trigger.

11. The system of claim 8, wherein the second network element is a service control point.

12. The system of claim 8, wherein the telecommunications network comprises a public switched telephone network.

13. A non-transitory computer-readable storage medium comprising a set of instructions for providing a telecommunications service, the set of instructions to direct a processor to implement:
   providing a menu during a telephone call from a network element of a telecommunications network to a caller, the menu providing a plurality of destination options including a first destination option for a residence of a family, a second destination option for a first member of the family at a first location other than the residence, and a third destination option for a second member of the family at a second location other than the residence;
   receiving during the telephone call a selection of the caller of one of the destination options;
   routing the telephone call via the telecommunications network to a first telephone number corresponding to the selection;
   detecting a trigger from the caller in the telephone call after routing the telephone call to the first telephone number corresponding to the first selection;
   after the detecting:
   interrupting the telephone call to the first telephone number;
   receiving during the telephone call a second selection of the caller of one of the destination options provided in the menu; and
   routing the telephone call to a second telephone number corresponding to the second selection.

14. The non-transitory computer-readable storage medium of claim 13 further comprising a set of instructions to direct the processor to implement:
   after interrupting the telephone call to the first telephone number, providing a portion of the menu in the telephone call.

15. The non-transitory computer-readable storage medium of claim 13, wherein the trigger comprises an originating dual-tone multi-frequency trigger.

16. The non-transitory computer-readable storage medium of claim 13, wherein the telecommunications network comprises a public switched telephone network.

17. The non-transitory computer-readable storage medium of claim 16, wherein the selection of the caller of one of the destination options is received at a switch located within a public switched telephone network.

* * * * *